United States Patent
Nojima et al.

(10) Patent No.: US 8,433,153 B2
(45) Date of Patent: Apr. 30, 2013

(54) IMAGE CORRECTION APPARATUS AND IMAGE CORRECTION METHOD

(75) Inventors: Yuri Nojima, Machida (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 13/026,703

(22) Filed: Feb. 14, 2011

(65) Prior Publication Data

US 2011/0142363 A1 Jun. 16, 2011

Related U.S. Application Data

(63) Continuation of application No. PCT/JP2008/002237, filed on Aug. 19, 2008.

(51) Int. Cl.
*G06K 9/40* (2006.01)

(52) U.S. Cl.
USPC .......................................................... 382/264

(58) Field of Classification Search ............... 348/94, 348/125, 425.2, E7.02, E7.023; 382/103, 382/149, 255, 264
See application file for complete search history.

(56) References Cited

U.S. PATENT DOCUMENTS

| | | | |
|---|---|---|---|
| 2005/0206966 A1* | 9/2005 | Kakumitsu | 358/461 |
| 2005/0231603 A1 | 10/2005 | Poon | |
| 2005/0286793 A1* | 12/2005 | Izumi et al. | 382/263 |
| 2006/0056835 A1 | 3/2006 | Poon et al. | |
| 2006/0078218 A1* | 4/2006 | Igarashi | 382/255 |
| 2006/0210188 A1* | 9/2006 | Poon et al. | 382/254 |

FOREIGN PATENT DOCUMENTS

| | | | |
|---|---|---|---|
| JP | 2005-310135 | | 11/2005 |
| JP | 2005-332381 | | 12/2005 |
| JP | 2006-11685 | * | 1/2006 |
| JP | 2006-24193 | * | 1/2006 |
| JP | 2006-24193 A | * | 1/2006 |
| JP | 2006-53854 | * | 2/2006 |
| JP | 2006-53854 A | * | 2/2006 |
| JP | 2006-115446 | | 4/2006 |
| JP | 2006-180445 | * | 7/2006 |
| JP | 2007-36894 | | 2/2007 |
| JP | 2008-123396 | * | 5/2008 |
| JP | 2008-123396 A | * | 5/2008 |

OTHER PUBLICATIONS

Notice of Rejection Ground mailed Apr. 24, 2012 (partial English translation enclosed) from corresponding Japanese Patent Application No. 2010-525501.*
J.-G Leu; "Edge Sharpening Through Ramp Width Reduction"; Image and Vision Computing 18 (2000); pp. 501-514.
International Search Report issued in International App. No. PCT/JP2008/002237, mailed Sep. 30, 2008.

* cited by examiner

*Primary Examiner* — Gregory F Cunningham
(74) *Attorney, Agent, or Firm* — Greer, Burns & Crain, Ltd.

(57) ABSTRACT

An image correction apparatus includes a gradient detection unit, a blur width detection unit, a correction area identification unit, and a correction unit. The gradient detection unit detects a gradient of a pixel value of each of pixels of an input image. The blur width detection unit detects a blur width at a position of each of the pixels of the input image. The correction area identification unit identifies a correction area based on the gradient detected by the gradient detection unit and the blur width detected by the blur width detection unit. The correction unit corrects a pixel value of a pixel in the correction area identified by the correction area identification unit.

11 Claims, 23 Drawing Sheets

| -1 | 0 | 1 |
|---|---|---|
| -2 | 0 | 2 |
| -1 | 0 | 1 |

X DIRECTION

| 1 | 2 | 1 |
|---|---|---|
| 0 | 0 | 0 |
| -1 | -2 | -1 |

Y DIRECTION

F I G. 3

| -1 | 0 | 0 | 0 | 1 |
|----|---|---|---|---|
| 0  | 0 | 0 | 0 | 0 |
| -2 | 0 | 0 | 0 | 2 |
| 0  | 0 | 0 | 0 | 0 |
| -1 | 0 | 0 | 0 | 1 |

X DIRECTION

| 1  | 0 | 2  | 0 | 1  |
|----|---|----|---|----|
| 0  | 0 | 0  | 0 | 0  |
| 0  | 0 | 0  | 0 | 0  |
| 0  | 0 | 0  | 0 | 0  |
| -1 | 0 | -2 | 0 | -1 |

Y DIRECTION

F I G. 4

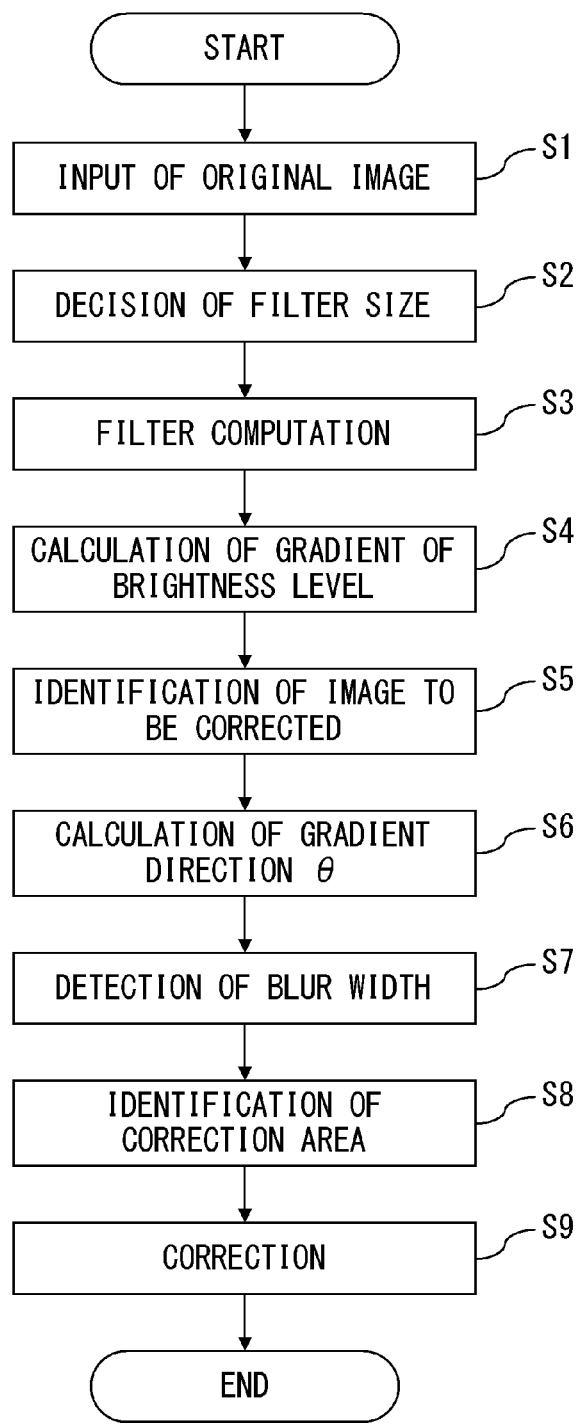
F I G. 6

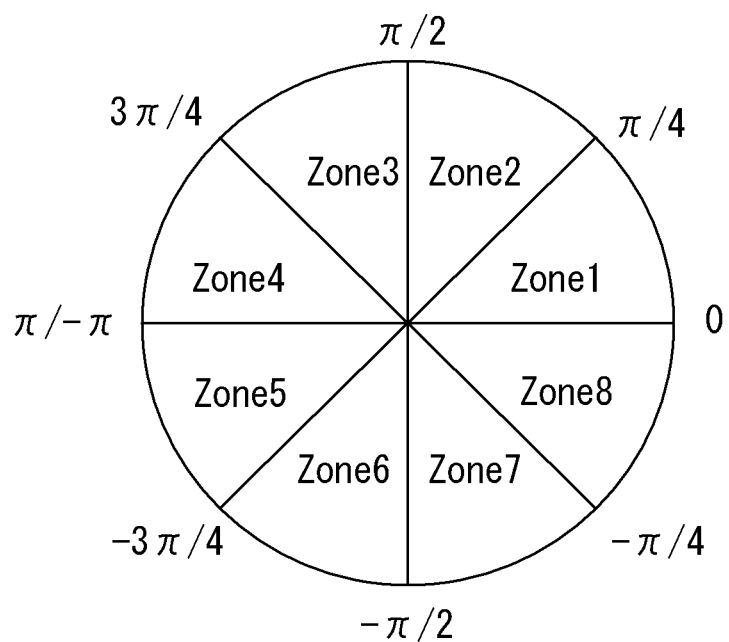
F I G. 7

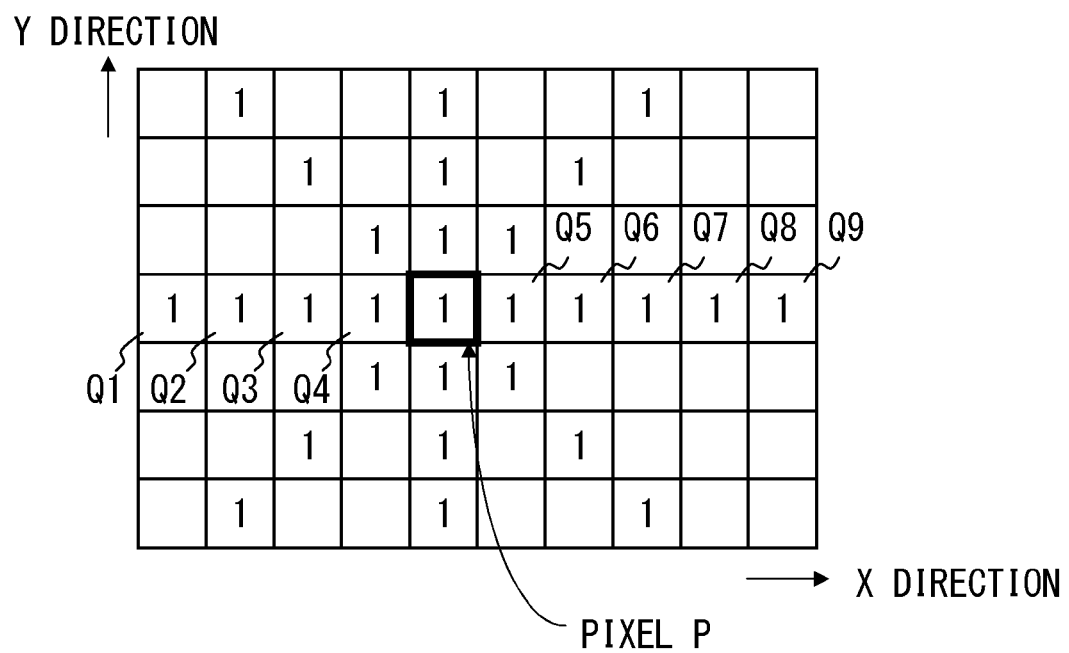
F I G. 8

| 0 | 0 | 0.25 |
|---|---|---|
| 0 | 0 | 0.5 |
| 0 | 0 | 025 |

$I_H(0)$

| 0.25 | 0 | 0 |
|---|---|---|
| 0.5 | 0 | 0 |
| 0.25 | 0 | 0 |

$I_H(\pi)$

| 0 | 0.5 | 0 |
|---|---|---|
| 0 | 0 | 0.5 |
| 0 | 0 | 0 |

$I_H(\pi/4)$

| 0 | 0 | 0 |
|---|---|---|
| 0.5 | 0 | 0 |
| 0 | 0.5 | 0 |

$I_H(-3\pi/4)$

| 0.25 | 0.5 | 0.25 |
|---|---|---|
| 0 | 0 | 0 |
| 0 | 0 | 0 |

$I_H(\pi/2)$

| 0 | 0 | 0 |
|---|---|---|
| 0 | 0 | 0 |
| 0.25 | 0.5 | 0.25 |

$I_H(-\pi/2)$

| 0 | 0.5 | 0 |
|---|---|---|
| 0.5 | 0 | 0 |
| 0 | 0 | 0 |

$I_H(3\pi/4)$

| 0 | 0 | 0 |
|---|---|---|
| 0 | 0 | 0.5 |
| 0 | 0.5 | 0 |

| 0 | 0.25 | 0 |
|---|---|---|
| 0 | 0.5 | 0 |
| 0 | 0.25 | 0 |

$I_M(0)$

| 0 | 0.25 | 0 |
|---|---|---|
| 0 | 0.5 | 0 |
| 0 | 0.25 | 0 |

$I_M(\pi)$

| 0.25 | 0 | 0 |
|---|---|---|
| 0 | 0.5 | 0 |
| 0 | 0 | 0.25 |

$I_M(\pi/4)$

| 0.25 | 0 | 0 |
|---|---|---|
| 0 | 0.5 | 0 |
| 0 | 0 | 0.25 |

$I_M(-3\pi/4)$

| 0 | 0 | 0 |
|---|---|---|
| 0.25 | 0.5 | 0.25 |
| 0 | 0 | 0 |

$I_M(\pi/2)$

| 0 | 0 | 0 |
|---|---|---|
| 0.25 | 0.5 | 0.25 |
| 0 | 0 | 0 |

$I_M(-\pi/2)$

| 0 | 0 | 0.25 |
|---|---|---|
| 0 | 0.5 | 0 |
| 0.25 | 0 | 0 |

$I_M(3\pi/4)$

| 0 | 0 | 0.25 |
|---|---|---|
| 0 | 0.5 | 0 |
| 0.25 | 0 | 0 |

| 0.25 | 0 | 0 |
|------|---|---|
| 0.5  | 0 | 0 |
| 0.25 | 0 | 0 |

$I_L(0)$

| 0 | 0 | 0.25 |
|---|---|------|
| 0 | 0 | 0.5  |
| 0 | 0 | 0.25 |

$I_L(\pi)$

| 0   | 0   | 0 |
|-----|-----|---|
| 0.5 | 0   | 0 |
| 0   | 0.5 | 0 |

$I_L(\pi/4)$

| 0 | 0.5 | 0   |
|---|-----|-----|
| 0 | 0   | 0.5 |
| 0 | 0   | 0   |

$I_L(-3\pi/4)$

| 0    | 0   | 0    |
|------|-----|------|
| 0    | 0   | 0    |
| 0.25 | 0.5 | 0.25 |

$I_L(\pi/2)$

| 0.25 | 0.5 | 0.25 |
|------|-----|------|
| 0    | 0   | 0    |
| 0    | 0   | 0    |

$I_L(-\pi/2)$

| 0 | 0   | 0   |
|---|-----|-----|
| 0 | 0   | 0.5 |
| 0 | 0.5 | 0   |

$I_L(3\pi/4)$

| 0   | 0.5 | 0 |
|-----|-----|---|
| 0.5 | 0   | 0 |
| 0   | 0   | 0 |

| 0 | 0 | 0 |
|---|---|---|
| 0 | 0 | 1 |
| 0 | 0 | 0 |

$G_H(0)$

| 0 | 0 | 0 |
|---|---|---|
| 1 | 0 | 0 |
| 0 | 0 | 0 |

$G_H(\pi)$

| 0 | 0.5 | 0 |
|---|---|---|
| 0 | 0 | 0.5 |
| 0 | 0 | 0 |

$G_H(\pi/4)$

| 0 | 0 | 0 |
|---|---|---|
| 0.5 | 0 | 0 |
| 0 | 0.5 | 0 |

$G_H(-3\pi/4)$

| 0 | 1 | 0 |
|---|---|---|
| 0 | 0 | 0 |
| 0 | 0 | 0 |

$G_H(\pi/2)$

| 0 | 0 | 0 |
|---|---|---|
| 0 | 0 | 0 |
| 0 | 1 | 0 |

$G_H(-\pi/2)$

| 0 | 0.5 | 0 |
|---|---|---|
| 0.5 | 0 | 0 |
| 0 | 0 | 0 |

$G_H(3\pi/4)$

| 0 | 0 | 0 |
|---|---|---|
| 0 | 0 | 0.5 |
| 0 | 0.5 | 0 |

| 0 | 0 | 0 |
|---|---|---|
| 1 | 0 | 0 |
| 0 | 0 | 0 |

$G_L(0)$

| 0 | 0 | 0 |
|---|---|---|
| 0 | 0 | 1 |
| 0 | 0 | 0 |

$G_L(\pi)$

| 0 | 0 | 0 |
|---|---|---|
| 0.5 | 0 | 0 |
| 0 | 0.5 | 0 |

$G_L(\pi/4)$

| 0 | 0.5 | 0 |
|---|---|---|
| 0 | 0 | 0.5 |
| 0 | 0 | 0 |

$G_L(-3\pi/4)$

| 0 | 0 | 0 |
|---|---|---|
| 0 | 0 | 0 |
| 0 | 1 | 0 |

$G_L(\pi/2)$

| 0 | 1 | 0 |
|---|---|---|
| 0 | 0 | 0 |
| 0 | 0 | 0 |

$G_L(-\pi/2)$

| 0 | 0 | 0 |
|---|---|---|
| 0 | 0 | 0.5 |
| 0 | 0.5 | 0 |

$G_L(3\pi/4)$

| 0 | 0.5 | 0 |
|---|---|---|
| 0.5 | 0 | 0 |
| 0 | 0 | 0 |

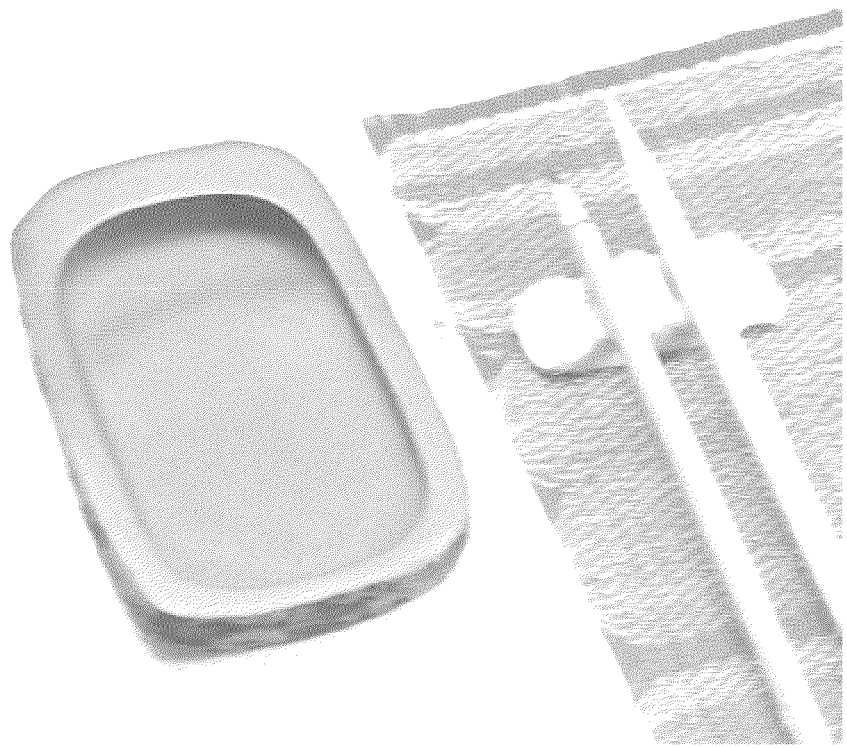
F I G. 1 6

IMAGE CORRECTION APPARATUS AND IMAGE CORRECTION METHOD

CROSS-REFERENCE TO RELATED APPLICATIONS

This application is a continuation of an international application PCT/JP2008/002237, which was filed on Aug. 19, 2008, the entire contents of which are incorporated herein by reference.

FIELD

The present invention relates to an image correction apparatus and an image correction method. The present invention is applicable to an image correction apparatus and an image correction method, which are intended to correct, for example, a blur of an image.

BACKGROUND

For example, a method for sharpening an edge of an object or a texture within an image is known as a technique of correcting a hand tremor (a tremor caused by a move of a subject is not included here) of a shot image.

In normal cases, a pixel value (such as brightness, intensity or the like) changes abruptly at an edge of an object or a texture within an image. A profile illustrated in FIG. 1 represents a change in a pixel value (brightness level here) of an edge. A horizontal axis of the profile represents a position of a pixel. Since the brightness level ramps up and down at an edge, an area including the edge is sometimes referred to as a ramp area in this specification.

To sharpen an edge, for example, as illustrated in FIG. 1, a brightness level of each pixel is decreased in an area (area A) where the brightness level is lower than a central level, whereas the brightness level of each pixel is increased in an area (area B) where the brightness level is higher than the central level. Note that the brightness level is not corrected outside the ramp area. With such corrections, the width of the ramp area is narrowed to sharpen the edge. This method is disclosed, for example, by J.-G Leu, Edge sharpening through ramp width reduction, Image and Vision Computing 18(2000) 501-514.

Additionally, an image processing method for correcting a blur in an image where only some of areas are blurred is proposed as a related technique. Namely, edge detection means detects an edge in eight different directions in a reduced image. Block partitioning means partitions the reduced image into 16 blocks. Analysis means determines whether or not an image of each of the blocks is a blurred image, and detects blur information (a blur width L, the degree of a blur, and a blur direction) of a block image that is a blurred image. Parameter setting means sets a correction parameter based on the blur information, and sets a correction intensity α according to the blur width L (For example, Japanese Laid-open Patent Publication No. 2005-332381).

However, an unnatural image is sometimes obtained if all edges are sharpened. Additionally, since an unnecessary correction is performed in this case, processing time sometimes increases. Furthermore, with the method for setting the correction intensity according to the blur width, a change in the brightness of an edge is corrected too sharply, making a shade too noticeable or enhancing the concavity and convexity of a human face to look wrinkled in some cases. Namely, image quality is sometimes degraded with the blur correction.

SUMMARY

According to an aspect of the invention, an image correction apparatus includes: a gradient detection unit to detect a gradient of a pixel value of each of pixels of an input image; a blur width detection unit to detect a blur width at a position of each of the pixels of the input image; a correction area identification unit to identify a correction area based on the gradient detected by the gradient detection unit and the blur width detected by the blur width detection unit; and a correction unit to correct a pixel value of a pixel in the correction area identified by the correction area identification unit.

According to another aspect of the invention, an image correction method includes: detecting a gradient of a pixel value of each of pixels of an input image; detecting a blur width at a position of each of the pixels of the input image; identifying a correction area based on the detected gradient and the detected blur width; and correcting a pixel value of a pixel in the identified correction area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates 3×3 Sobel filters;

FIG. 4 illustrates 5×5 Sobel filters;

FIG. 6 is a flowchart illustrating an image correction method according to the embodiment;

FIG. 7 illustrates a direction of a gradient of a brightness level defined within an image;

FIG. 8 is an explanatory view of a method for detecting a blur width based on a direction of a gradient of a brightness level;

FIGS. 10-12 illustrate filters for calculating a pixel intensity index;

FIGS. 13-14 illustrate filters for calculating a gradient index $G_H$;

FIG. 16 illustrates an image corrected with the method according to the embodiment;

DESCRIPTION OF EMBODIMENTS

Figure 2:
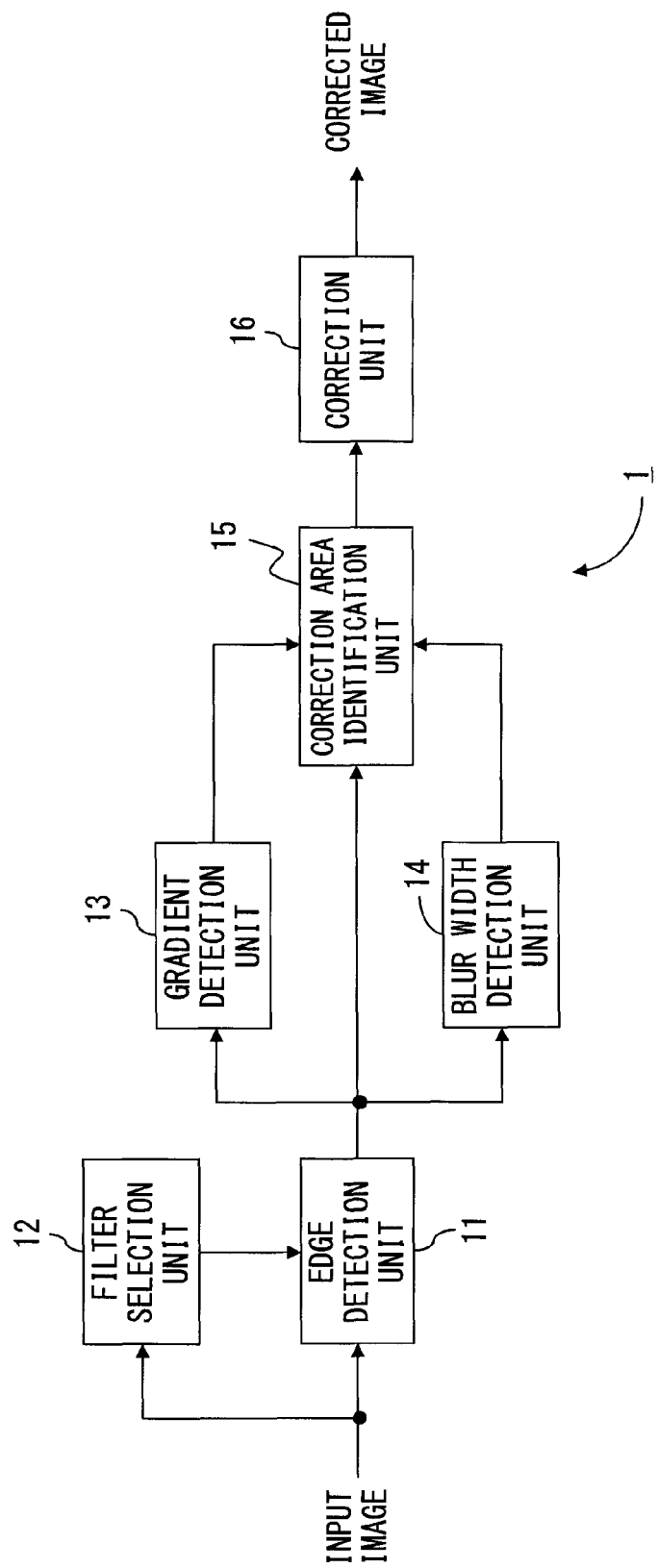
FIG. 2 illustrates a configuration of an image correction apparatus according to an embodiment.

FIG. 2 illustrates a configuration of an image correction apparatus according to an embodiment. The image correction apparatus 1 according to the embodiment corrects, for example, an image obtained with an electronic camera although the apparatus is not particularly limited. Moreover, the image correction apparatus 1 is assumed to correct a hand tremor. A hand tremor is caused, for example, by a move of a shooting device when an image is shot. Furthermore, image degradation caused by a hand tremor mainly occurs in an edge of an object or a texture within an image. Accordingly, the image correction apparatus 1 corrects a hand tremor by sharpening an edge and/or by enhancing a contour.

The image correction apparatus 1 includes an edge detection unit 11, a filter selection unit 12, a gradient detection unit 13, a blur width detection unit 14, a correction area identification unit 15, and a correction unit 16. The edge detection unit 11 is, for example, a Sobel filter in this embodiment, and performs a filter computation for each of pixels of an input image. With the filter computation, an edge of an object or a texture within the input image is detected. Moreover, the edge detection unit 11 includes a plurality of Sobel filters having different sizes. In this embodiment, the edge detection unit 11 includes one pair of 3×3 Sobel filters illustrated in FIG. 3, and one pair of 5×5 Sobel filters illustrated in FIG. 4. Each of the pairs of Sobel filters includes X direction Sobel filter and Y direction Sobel filter.

Each of the Sobel filters performs a filter computation by using pixel values (such as brightness level values) of a target pixel and pixels adjacent to the target pixel. Namely, each of the 3×3 Sobel filters performs a filter computation by using the brightness level values of a target pixel and eight pixels adjacent to the target pixel (a total of nine pixels). Each of the 5×5 Sobel filters performs a filter computation by using brightness level values of a target pixel and 24 pixels adjacent to the target pixel (a total of 25 pixels). With these filter computations, a gradient of a pixel value of each of the pixels is calculated.

The filter selection unit 12 selects a Sobel filter to be used in the edge detection unit 11 according to a size of the input image. The size of the input image is defined, for example, based on the number of pixels. In this case, for example, 3×3 Sobel filter is selected if the size of the input image is equal to or smaller than 1M pixels, and 5×5 Sobel filter is selected if the size of the input image is larger than 1M pixels. The edge detection unit 11 performs a filter computation for the input image by using the Sobel filter selected by the filter selection unit 12. A blur area grows with an increase in an image size. Accordingly, suitable edge detection is performed by varying the size of a Sobel filter according to the size of an input image.

The gradient detection unit 13 detects a gradient of a pixel value of each of the pixels of the input image. In this embodiment, the gradient detection unit 13 calculates the gradient of the brightness level value of each of the pixels of the input image by using results of the filter computations of the edge detection unit 11. The blur width detection unit 14 calculates a blur width at a position of each of the pixels by using results of the filter computations of the edge detection unit 11.

The correction area identification unit 15 identifies an area to be corrected based on the gradient detected by the gradient detection unit 13 and the blur width detected by the blur width detection unit 14. The correction unit 16 corrects the pixel value of each of pixels of the area identified by the correction area identification unit 15. The correction unit 16 performs, for example, a contour correction for sharpening an edge, and/or contour enhancement.

Figure 5:
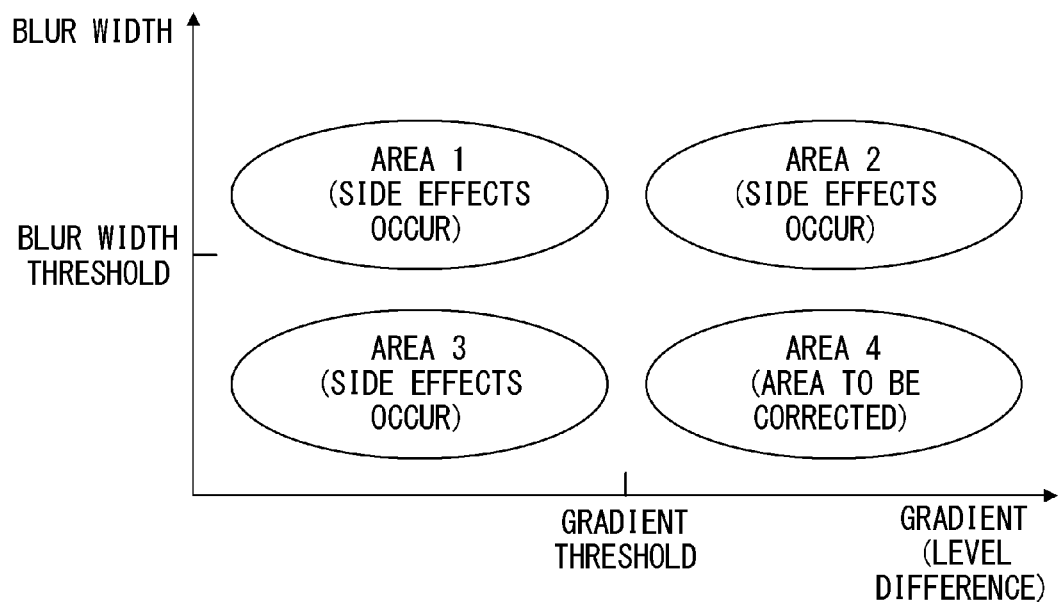
FIG. 5 is an explanatory view of operations of a correction area identification unit.

FIG. 5 is an explanatory view of operations of the correction area identification unit 15. The correction area identification unit 15 identifies an area to be corrected based on both the gradient detected by the gradient detection unit 13 and the blur width detected by the blur width detection unit 14. Here, if a hand tremor correction such as edge sharpening or the like is performed in areas (areas 1 and 2) where a blur width is large, image quality is sometimes degraded. In contrast, if the hand tremor correction is performed in areas (areas 1 and 3) where a gradient of a pixel value is small, an image after being corrected becomes unnatural or an effect of improving image quality with the correction is small.

Accordingly, in the image correction apparatus 1 according to the embodiment, an area (namely, the area 4) where the gradient detected by the gradient detection unit 13 is larger than a gradient threshold value and the blur width detected by the blur width detection unit 14 is smaller than a blur width threshold value is identified as an area to be corrected. Then, pixel values of pixels belonging to the identified area are corrected. As a result, the image after being corrected does not become unnatural, and the effect of improving image quality with the correction increases. Moreover, since the correction is not performed for the pixels belonging to the areas 1 to 3, the number of pixels to be corrected is decreased, leading to reductions in processing time and load imposed on a processor that performs the correction computation.

The blur width threshold value is defined, for example, according to the size of an input image although the way of defining the blur width threshold value is not particularly limited. As one example, 1 percent of the number of pixels in the X direction of a frame is defined as the blur width threshold value. In this case, for example, in an image of 5M pixels (2560×1920 pixels), the blur width threshold value is 25 pixels. In this case, if a blur width detected at a certain pixel position is equal to or smaller than the width of 25 pixels, the pixel belongs to the areas 3 and 4. In contrast, if the blur width detected at the certain pixel position is larger than the width of 25 pixels, the pixel belongs to the areas 1 and 2. Note that the blur width threshold value may be defined based on another criterion. For example, the blur width threshold value may be decided to allow an optimum image (such as the most natural image when viewed by the human eyes) to be obtained by monitoring an image after being corrected while varying the blur width threshold value in an experiment or simulation.

The gradient threshold value is decided, for example, with an experiment or simulation although the way of deciding the gradient threshold value is not particularly limited. In this case, an image after being corrected is monitored while varying the gradient threshold value, which is decided so that an optimum image (such as the most natural image when viewed with the human eyes) is obtained. Moreover, the gradient threshold value may be decided in consideration of noise of an image. Namely, for example, if the noise of an image appears as a gradient of a pixel value, a hand tremor correction is performed for the noise. In this case, the noise is enhanced, and the image quality of the image after being corrected is degraded comparing with an original image. For this reason, the gradient threshold value for an image with a lot of noise may be set to a larger value than that in a normal case. Alternatively, the gradient threshold value for an image having low noise may be set to a smaller value than that in a normal case.

As described above, in the image correction apparatus 1 according to the embodiment, pixel values of the pixels belonging to the areas 1 to 3 illustrated in FIG. 5 are not corrected. Therefore, the image does not become unnatural with the correction or the image quality of the image is not degraded by the correction. Moreover, not only the amount of computation for the image correction but power consumption is reduced.

Note that the image correction apparatus 1 may include a smoothing filter for smoothing an input image, for example, on the input side of the edge detection unit 11. In this case, the size of the smoothing filter may be decided according to the size of an input image. By providing the smoothing filter, noise of an input image is removed or reduced.

FIG. 6 is a flowchart illustrating an image correction method according to the embodiment. The image correction method according to the embodiment is described below with reference to this flowchart.

Edge Detection

In step S1, image data of an input image is input. The image data includes pixel values (such as brightness level values in this embodiment) of pixels. In step S2, the filter selection unit 12 decides the size of a Sobel filter to be used in the edge detection unit 11. The size of the Sobel filter is decided according to the size of the input image as described above. Then, in step S3, the edge detection unit 11 performs Sobel filter computation for each of the pixels of the input image by using the filter decided in step S2. Note that Sobel filter computations are performed for X direction and Y direction, respectively.

The Sobel filter calculates the amount of a change in a brightness level (namely, a gradient of a brightness level) by using brightness level values of pixels adjacent to a target pixel as illustrated in FIGS. 3 and 4. In an area where the brightness level is constant, the Sobel filter computation results in zero or a small value close to zero. However, in an area where the brightness level increases in the X direction, computation performed by X direction Sobel filter results in a positive value. In contrast, in an area where the brightness level decreases in the X direction, computation performed by the X direction Sobel filter results in a negative value. Similar results are obtained in the Y direction. In an edge area of an object or a texture within an image, a brightness level significantly or abruptly changes. Accordingly, computation performed by a Sobel filter results in a large value in the edge area. Namely, an edge is detected based on a result of the computation performed by the Sobel filter.

Detection of a Gradient of a Brightness Level

In step S4, the gradient detection unit 13 calculates a gradient of a brightness level for each of the pixels of the input image. The gradient of the brightness level "gradMag" is calculated with the following equation (1). "gradX" represents a computation result of the X direction Sobel filter, whereas "gradY" represents a computation result of the Y direction Sobel filter.

$$gradMag = \sqrt{gradX^2 + gradY^2} \quad (1)$$

Alternatively, the gradient may be calculated with the following equation (2) instead of the above described equation (1) in order to reduce the amount of computation.

$$gradMag = |gradX| + |gradY| \quad (2)$$

In step S5, the gradient gradMag obtained for each of the pixels is compared with the gradient threshold value. If the gradient gradMag is larger than the gradient threshold value, the corresponding pixel is determined as a correction target.

In contrast, if the gradient gradMag is equal to or smaller than the gradient threshold value, the pixel is determined not as a correction target.

If a brightness level of a pixel is represented, for example, with 8-bit digital data, the value of the brightness level is denoted by a numeric value from 0 to 255. The gradient threshold value is, for example, but not particularly limited to, approximately 10 percent of the maximum value of the brightness level. In this case, the gradient threshold value is 25. A method for deciding the gradient threshold value is not particularly limited, and may be decided with an experiment, simulation or the like as described above.

Detection of a Blur Width

A blur width at a position of each of the pixels is detected with the following method although the method for detecting a blur width is not particularly limited.

In step S6, the blur width detection unit 14 obtains a direction of a gradient for each of the pixels by using results of the Sobel computations. The direction of the gradient "PixDirection(θ)" is obtained with the following equation (3). If "gradX" is close to zero (for example, gradX<10$^{-6}$), PixDirection=−π/2 is assumed.

$$PixDirection(\theta) = \arctan\left(\frac{gradY}{gradX}\right) \quad (3)$$

Next, it is determined, for each of the pixels, which of Zone 1 to Zone 8 illustrated in FIG. 7 the direction of the gradient belongs to. Zone 1 to Zone 8 are as follows.

Zone1: 0≦PixDirection<π/4 and gradX>0
Zone2: π/4≦PixDirection<π/2 and gradY>0
Zone3: −π/2≦PixDirection<−π/4 and gradY<0
Zone4: −π/4≦PixDirection<0 and gradX<0
Zone5: 0≦PixDirection<π/4 and gradX<0
Zone6: π/4≦PixDirection<π/2 and gradY<0
Zone7: −π/2≦PixDirection<−π/4 and gradY>0
Zone8: −π/4≦PixDirection<0 and gradX>0

In step S7, the blur width is detected based on the number of successive pixels having the same or nearly the same brightness level gradient direction at the position of each of the pixels. The direction of the gradient of the brightness level for each of the pixels is represented with Zone 1 to Zone 8 obtained in step S6.

FIG. 8 is an explanatory view of a method for detecting a blur width based on the direction of a gradient of a brightness level. In the following description, the direction of a gradient of a brightness level is sometimes referred to as a "gradient direction θ". Moreover, "1" illustrated in FIG. 8 represents that the gradient direction θ belongs to Zone 1 illustrated in FIG. 7. Gradient directions θ for Zone 2 to Zone 8 are not illustrated in FIG. 8.

In the example illustrated in FIG. 8, 10 successive pixels having the gradient direction θ that belongs to Zone 1 stand in a row in the X direction. Meanwhile, 7 successive pixels having the gradient direction θ that belongs to Zone 1 stand in a column in the Y direction. Furthermore, 7 successive pixels having the gradient direction θ that belongs to Zone 1 stand respectively in diagonal directions. Here, in a hand tremor image, gradient directions θ of an edge area of an object or a texture should be almost identical. In other words, an area where pixels having the same gradient direction θ are successive is considered to be an edge area of the hand tremor image. Moreover, a width (namely, the number of successive pixels having the same gradient direction θ) of the area where the pixels having the same gradient direction θ are successive is equivalent to the blur width caused by the hand tremor.

In step S8, a correction area (an area to be corrected) is identified by using the detection result of step S7. In other words, pixels that are not to be corrected are identified by using the detection result of step S7. In one embodiment, the number (hereinafter referred to as a successive pixel number C) of successive pixels having the same gradient direction θ is compared with a specified threshold value. Here, assume that the threshold value is 8 in the implementation example illustrated in FIG. 8. In this case, the successive pixel number C in the X direction is 10, which is larger than the above described threshold value. In this case, 4 pixels (Q1 to Q4) located on the left side of a focused pixel P, and 5 pixels (Q5 to Q9) located on the right side of the focused pixel P are excluded from correction targets. Note that the pixels Q1-Q4 and Q5-Q9 of FIG. 8 are considered to be within the area 1 or area 2 in FIG. 5.

The method for detecting a blur width is not particularly limited, and another method may be used to detect a blur width. For example, if a hand tremor correction is performed by using a plurality of continuously-shot images, a blur width may be calculated based on the magnitude of a motion vector among the continuously-shot images. In this case, for example, if the magnitude of the motion vector exceeds 1 percent of the horizontal width of an input image, the blur width is determined to exceed the blur width threshold value.

Blur Correction Process

In step S9, the correction unit 16 performs a correction process for pixels that belong to the correction area identified in steps S2 to S8. In steps S4 and S5, pixels having a brightness level gradient that is larger than the gradient threshold value are identified. Namely, the pixels belonging to the areas 2 and 4 illustrated in FIG. 5 are identified. Moreover, in steps S6 to S8, areas where the blur width is larger than the blur width threshold value are identified. Namely, the pixels belonging to the areas 3 and 4 illustrated in FIG. 5 are identified. Accordingly, pixels belonging to the area 4 in FIG. 5 are obtained and a brightness level correction is performed only for the obtained pixels belonging to the area.

As described above, the pixels belonging to the areas 1 and 3 in FIG. 5 are excluded in steps S4 and S5. Here, if the hand tremor correction is performed for the pixels belonging to the areas 1 and 3, the image may become unnatural with high possibility. Accordingly, the correction is not performed for the pixels belonging to the areas 1 and 3, thereby preventing the image from becoming unnatural and reducing processing time needed for the image correction. Moreover, the pixels belonging to the areas 1 and 2 in FIG. 5 are excluded in steps S6 to S8. As a result, the pixels that may cause side effects are not corrected, whereby the hand tremor is corrected while preventing image quality from being degraded.

The correction method in step S9 is specifically described below with reference to the flowchart illustrated in FIG. 9. The correction unit 16 executes following correction process for pixels within the correction area identified in steps S2 to S8.

In step S11, evaluation indexes $I_H$, $I_M$, $I_L$, $G_H$, $G_M$ and $G_L$ are calculated for each of the pixels. In step S12, whether or not each of the pixels belongs to the blur area is determined by using the evaluation indexes $I_H$, $I_M$ and $I_L$. Steps S13 to S15 are performed for a pixel determined to belong to the blur area.

In step S13, whether or not to correct the brightness of a target pixel is determined by using the evaluation indexes $G_H$, $G_M$ and $G_L$, of the target pixel. If it is determined to correct the brightness, the amount of a correction is calculated by using the evaluation indexes $I_H$, $I_M$, $I_L$, $G_H$, $G_M$ and $G_L$. Then, in step S15, the original image is corrected according to the calculated amount of a correction.

Figure 9:
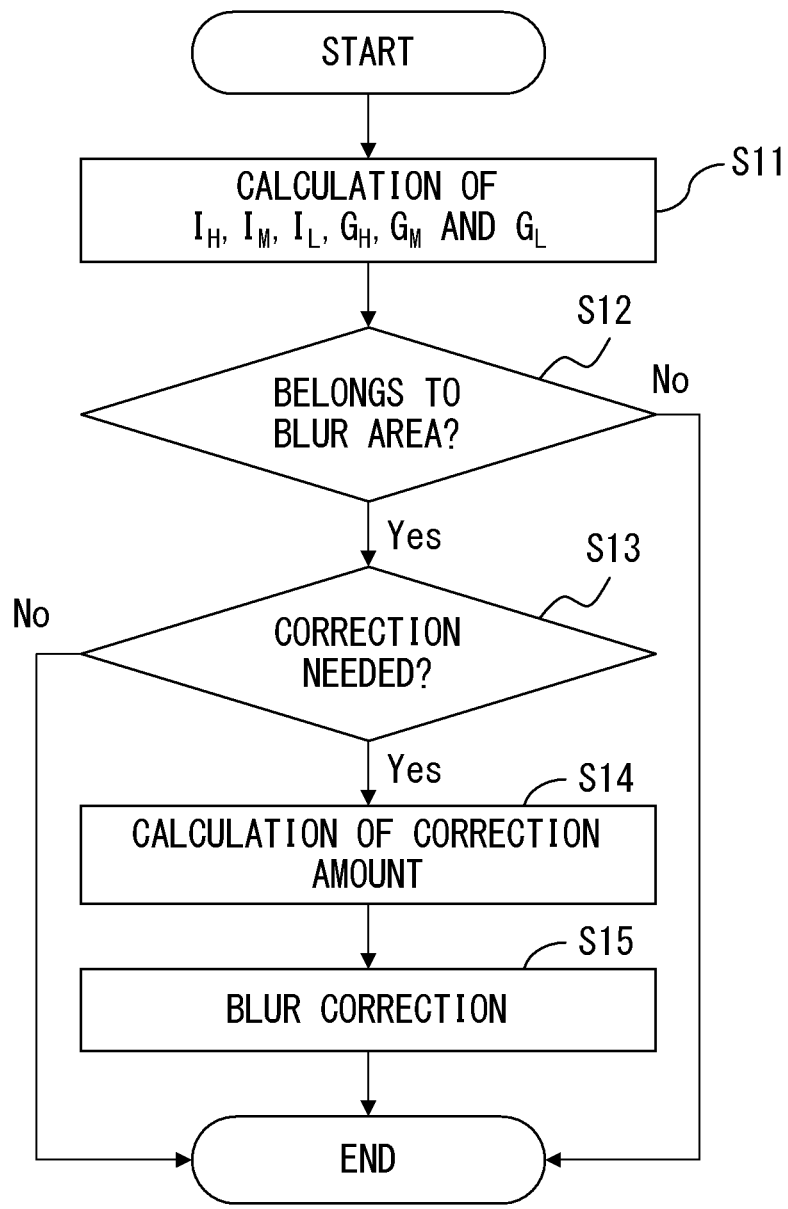
FIG. 9 is a flowchart illustrating operations of a correction unit.

Steps S11 to S15 illustrated in FIG. 9 correspond to a process for sharpening an edge by narrowing the width of a ramp area (area where a brightness level value ramps) of the edge. Processes in steps S11 to S15 are described below.

Evaluation Indexes Calculation (Step S11)

The pixel intensity indexes $I_H$, $I_M$ and $I_L$ are calculated for each of the pixels (namely, the pixels belonging to the area 4 illustrated in FIG. 5) identified with the procedures illustrated in FIG. 6. The pixel intensity indexes $I_H$, $I_M$ and $I_L$ depend on the direction of the gradient obtained with the above equation (3). An example of calculating the pixel intensity indexes $I_H$, $I_M$ and $I_L$ when the direction of the gradient belongs to Zone 1 ($0 \leq \theta < \pi/4$) is described as an implementation example. The direction of the gradient of a pixel (i,j) is hereinafter referred to as "θ(i,j)".

Initially, the following equations are defined for "θ=0". "P(i,j)" represents a brightness value of a pixel positioned at coordinates (i,j). "P(i,j+1)" represents a brightness value of a pixel positioned at coordinates (i,j+1). The similar expressions are applied to the other pixels.

$$I_H(0)=0.25\times\{P(i+1,j+1)+2\times P(i,j+1)+P(i-1,j+1)\}$$

$$I_M(0)=0.25\times\{P(i+1,j)+2\times P(i,j)+P(i-1,j)\}$$

$$I_L(0)=0.25\times\{P(i+1,j-1)+2\times P(i,j-1)+P(i-1,j-1)\}$$

Similarly, the following equations are defined for "θ=π/4".

$$I_H(\pi/4)=0.5\times\{P(i+1,j)+P(i,j+1)\}$$

$$I_M(\pi/4)=0.25\times\{P(i+1,j-1)+2\times P(i,j)+P(i-1,j+1)\}$$

$$I_L(\pi/4)=0.5\times\{P(i,j-1)+P(i-1,j)\}$$

Here, the three pixel intensity indexes of Zone 1 are calculated with linear interpolation using the pixel intensity indexes of "θ=0" and those of "θ=π/4". Namely, the three pixel intensity indexes of Zone 1 are calculated with the following equations.

$$I_{H,Zone1}=I_H(0)\times\omega+I_H(\pi/4)\times(1-\omega)$$

$$I_{M,Zone1}=I_M(0)\times\omega+I_M(\pi/4)\times(1-\omega)$$

$$I_{L,Zone1}=I_L(0)\times\omega+I_L(\pi/4)\times(1-\omega)$$

$$\omega=1-\{4\times\theta(i,j)\}/\pi$$

Also the pixel intensity indexes of Zone 2 to Zone 8 can be calculated with similar procedures. Namely, the pixel intensity indexes are respectively calculated for "θ=0, π/4, π/2, 3π/4, π, -3π/4, -π/2, and -π/4". These pixel intensity indexes are respectively obtained by performing 3×3 filter computation for the brightness value of each of the pixels of an input image. The input image may be smoothed. FIGS. 10, 11 and 12 illustrate an example of filters for respectively obtaining the pixel intensity indexes $I_H$, $I_M$ and $I_L$.

By using the filters illustrated in FIGS. 10-12, the pixel intensity indexes $I_H$, $I_M$ and $I_L$ in eight specified directions are calculated. The pixel intensity indexes $I_H$ of the Zones are respectively calculated with the following equations by using the pixel intensity indexes $I_H$ in two corresponding directions.

$$I_{H,Zone1}=I_H(0)\times w15+I_H(\pi/4)\times(1-w15)$$

$$I_{H,Zone2}=I_H(\pi/2)\times w26+I_H(\pi/4)\times(1-w26)$$

$$I_{H,Zone3}=I_H(\pi/2)\times w37+I_H(3\pi/4)\times(1-w37)$$

$$I_{H,Zone4}=I_H(\pi) \times w48 + I_H(3\pi/4) \times (1-w48)$$

$$I_{H,Zone5}=I_H(\pi) \times w15 + I_H(-3\pi/4) \times (1-w15)$$

$$I_{H,Zone6}=I_H(-\pi/2) \times w26 + I_H(-3\pi/4) \times (1-w26)$$

$$I_{H,Zone7}=I_H(-\pi/2) \times w37 + I_H(-\pi/4) \times (1-w37)$$

$$I_{H,Zone8}=I_H(0) \times w48 + I_H(-\pi/4) \times (1-w48)$$

where w15, w26, w37 and w48 are respectively represented with the following equations.

$$W15 = 1 - 4\theta/\pi$$

$$W26 = 4\theta/\pi - 1$$

$$W37 = -1 - 4\theta/\pi$$

$$W48 = 1 + 4\theta/\pi$$

Additionally, the pixel intensity indexes $I_M$ of the Zones are respectively calculated with the following equations by using the pixel intensity indexes $I_M$ in two corresponding directions.

$$I_{M,Zone1}=I_M(0) \times w15 + I_M(\pi/4) \times (1-w15)$$

$$I_{M,Zone2}=I_M(\pi/2) \times w26 + I_M(\pi/4) \times (1-w26)$$

$$I_{M,Zone3}=I_M(\pi/2) \times w37 + I_M(3\pi/4) \times (1-w37)$$

$$I_{M,Zone4}=I_M(\pi) \times w48 + I_M(3\pi/4) \times (1-w48)$$

$$I_{M,Zone5}=I_M(\pi) \times w15 + I_M(-3\pi/4) \times (1-w15)$$

$$I_{M,Zone6}=I_M(-\pi/2) \times w26 + I_M(-3\pi/4) \times (1-w26)$$

$$I_{M,Zone7}=I_M(-\pi/2) \times w37 + I_M(-\pi/4) \times (1-w37)$$

$$I_{M,Zone8}=I_M(0) \times w48 + I_M(-\pi/4) \times (1-w48)$$

Similarly, the pixel intensity indexes $I_L$ of the Zones are respectively calculated with the following equations by using the pixel intensity indexes $I_L$ in two corresponding directions.

$$I_{L,Zone1}=I_L(0) \times w15 + I_L(\pi/4) \times (1-w15)$$

$$I_{L,Zone2}=I_L(\pi/2) \times w26 + I_L(\pi/4) \times (1-w26)$$

$$I_{L,Zone3}=I_L(\pi/2) \times w37 + I_L(3\pi/4) \times (1-w37)$$

$$I_{L,Zone4}=I_L(\pi) \times w48 + I_L(3\pi/4) \times (1-w48)$$

$$I_{L,Zone5}=I_L(\pi) \times w15 + I_L(-3\pi/4) \times (1-w15)$$

$$I_{L,Zone6}=I_L(-\pi/2) \times w26 + I_L(-3\pi/4) \times (1-w26)$$

$$I_{L,Zone7}=I_L(-\pi/2) \times w37 + I_L(-\pi/4) \times (1-w37)$$

$$I_{L,Zone8}=I_L(0) \times w48 + I_L(-\pi/4) \times (1-w48)$$

When the pixel intensity indexes $I_H$, $I_M$ and $I_L$ are calculated for each of the pixels as described above, the following procedures are executed.

(a) The direction $\theta$ of the gradient is calculated.
(b) The Zone corresponding to $\theta$ is detected.
(c) A filter computation is performed by using a set of filters corresponding to the detected Zone. For example, if $\theta$ belongs to Zone 1, $I_H(0)$ and $I_H(\pi/4)$ are calculated by using the filters illustrated in FIG. 10. Similar calculations are performed for $I_M$ and $I_L$.
(d) $I_H$, $I_M$ and $I_L$ are calculated on results of the computations of the set of filters obtained in the above described (c) and based on $\theta$.

Next, the gradient indexes $G_H$, $G_M$ and $G_L$ are calculated for each of the pixels. Similarly to the pixel intensity indexes $I_H$, $I_M$ and $I_L$, the gradient indexes $G_H$, $G_M$ and $G_L$ depend on the direction of the gradient obtained with the above equation (3). Accordingly, an example of calculating the gradient indexes $G_H$, $G_M$ and $G_L$ of Zone 1 ($0 \leq \theta < \pi/4$) is described in a similar manner to the pixel intensity indexes.

The following equations are defined for "$\theta=0$". "gradMag(i,j)" represents the magnitude of the gradient of the pixel positioned at the coordinates (i,j). "gradMag(i+1, j)" represents the magnitude of the gradient of the pixel positioned at the coordinates (i+1, j). The similar expressions are applied to other pixels.

$$G_H(0) = \text{gradMag}(i, j+1)$$

$$G_M(0) = \text{gradMag}(i, j)$$

$$G_L(0) = \text{gradMag}(i, j-1)$$

Similarly, the following equations are defined for "$\theta=\pi/4$".

$$G_H(\pi/4) = 0.5 \times \{\text{gradMag}(i+1,j) + \text{gradMag}(i,j+1)\}$$

$$G_M(\pi/4) = \text{gradMag}(i,j)$$

$$G_L(\pi/4) = 0.5 \times \{\text{gradMag}(i,j-1) + \text{gradMag}(i-1,j)\}$$

Here, the gradient indexes of Zone 1 are calculated with linear interpolation using the gradient indexes of "$\theta=0$" and those of "$\theta=\pi/4$". Namely, the gradient indexes of Zone 1 are calculated with the following equations.

$$G_{H,Zone1} = G_H(0) \times \omega + G_H(\pi/4) \times (1-\omega)$$

$$G_{L,Zone1} = G_L(0) \times \omega + G_M(\pi/4) \times (1-\omega) = \text{gradMag}(i,j)$$

$$G_{L,Zone1} = G_L(0) \times \omega + G_L(\pi/4) \times (1-\omega)$$

$$\omega = 1 - \{4 \times \theta(i,j)\}/\pi$$

As described above, the gradient index $G_M$ is always "gradMag(i,j)" and does not depend on the direction $\theta$ of the gradient. Namely, the gradient index $G_M$ of each of the pixels is calculated using the above described equation (1) or (2) regardless of the direction $\theta$ of the gradient.

Also, the gradient indexes of Zone 2 to Zone 8 are calculated using similar procedures. Namely, the gradient indexes are respectively calculated for "$\theta=0, \pi/4, \pi/2, 3\pi/4, \pi, -3\pi/4, -\pi/2$, and $-\pi/4$". These gradient indexes are obtained by respectively performing the 3×3 filter computation for the magnitude gradMag of the gradient of each of the pixels of an input image. The input image may be smoothed. FIGS. 13 and 14 illustrate an example of the filters for respectively obtaining the gradient indexes $G_H$ and $G_L$.

By performing such filter computations, the gradient indexes $G_H$ and $G_L$ in the eight specified directions are obtained. The gradient indexes $G_H$ of the Zones are respectively calculated with the following equations by using the gradient indexes $G_H$ in two corresponding directions.

$$G_{H,Zone1} = G_H(0) \times w15 + G_H(\pi/4) \times (1-w15)$$

$$G_{H,Zone2} = G_H(\pi/2) \times w26 + G_H(\pi/4) \times (1-w26)$$

$$G_{H,Zone3} = G_H(\pi/2) \times w37 + G_H(3\pi/4) \times (1-w37)$$

$$G_{H,Zone4} = G_H(\pi) \times w48 + G_H(3\pi/4) \times (1-w48)$$

$$G_{H,Zone5} = G_H(\pi) \times w15 + G_H(-3\pi/4) \times (1-w15)$$

$$G_{H,Zone6} = G_H(-\pi/2) \times w26 + G_H(-3\pi/4) \times (1-w26)$$

$$G_{H,Zone7} = G_H(-\pi/2) \times w37 + G_H(-\pi/4) \times (1-w37)$$

$$G_{H,Zone8} = G_H(0) \times w48 + G_H(-\pi/4) \times (1-w48)$$

where w15, w26, w37 and w48 are respectively represented by the following equations.

$$W15 = 1 - 4\theta/\pi$$

$$W26 = 4\theta/\pi - 1$$

$$W37 = -1 - 4\theta/\pi$$

$$W48 = 1 + 4\theta/\pi$$

Similarly, the gradient indexes $G_L$, of the Zones are respectively calculated with the following equations by using the gradient indexes $G_L$, in two corresponding directions.

$$G_{L,Zone1} = G_L(0) \times w15 + G_L(\pi/4) \times (1-w15)$$

$$G_{L,Zone2} = G_L(\pi/2) \times w26 + G_L(\pi/4) \times (1-w26)$$

$$G_{L,Zone3} = G_L(\pi/2) \times w37 + G_L(3\pi/4) \times (1-w37)$$

$$G_{L,Zone4} = G_L(\pi) \times w48 + G_L(3\pi/4) \times (1-w48)$$

$$G_{L,Zone5} = G_L(\pi) \times w15 + G_L(-3\pi/4) \times (1-w15)$$

$$G_{L,Zone6} = G_L(-\pi/2) \times w26 + G_L(-3\pi/4) \times (1-w26)$$

$$G_{L,Zone7} = G_L(-\pi/2) \times w37 + G_L(-\pi/4) \times (1-w37)$$

$$G_{L,Zone8} = G_L(0) \times w48 + G_L(-\pi/4) \times (1-w48)$$

When the gradient indexes $G_H$, $G_M$ and $G_L$, are calculated for each of the pixels as described above, the following procedures are executed.
(a) The magnitude gradMag of the gradient is calculated.
(b) $G_M$ is calculated based on gadMag.
(c) The direction θ of the gradient is calculated.
(d) A Zone corresponding to θ is detected.
(e) A filter computation is performed by using a set of filters corresponding to the detected Zone. For example, if θ belongs to Zone 1, $G_H(0)$ and $G_H(\pi/4)$ are calculated by using the filters illustrated in FIG. 13. $G_L$ is calculated in similar way.
(f) $G_H$ and $G_L$ are calculated based on results of the computations of the set of filters obtained in the above described (e) and based on θ.

As described above, the evaluation indexes (the pixel intensity indexes $I_H$, $I_M$ and $I_L$ and the gradient indexes $G_H$, $G_M$ and $G_L$) are calculated for each of the pixels in step S11. These evaluation indexes are used to detect a blurred area, and to calculate the amount of a correction.

Detection of a Blurred Area (Step S12)

Whether or not the condition represented by the following equation (4) is satisfied is checked for each of the pixels. Equation (4) represents that a target pixel is positioned halfway of a brightness slope.

$$I_H > I_M > I_L \quad (4)$$

Figure 1:
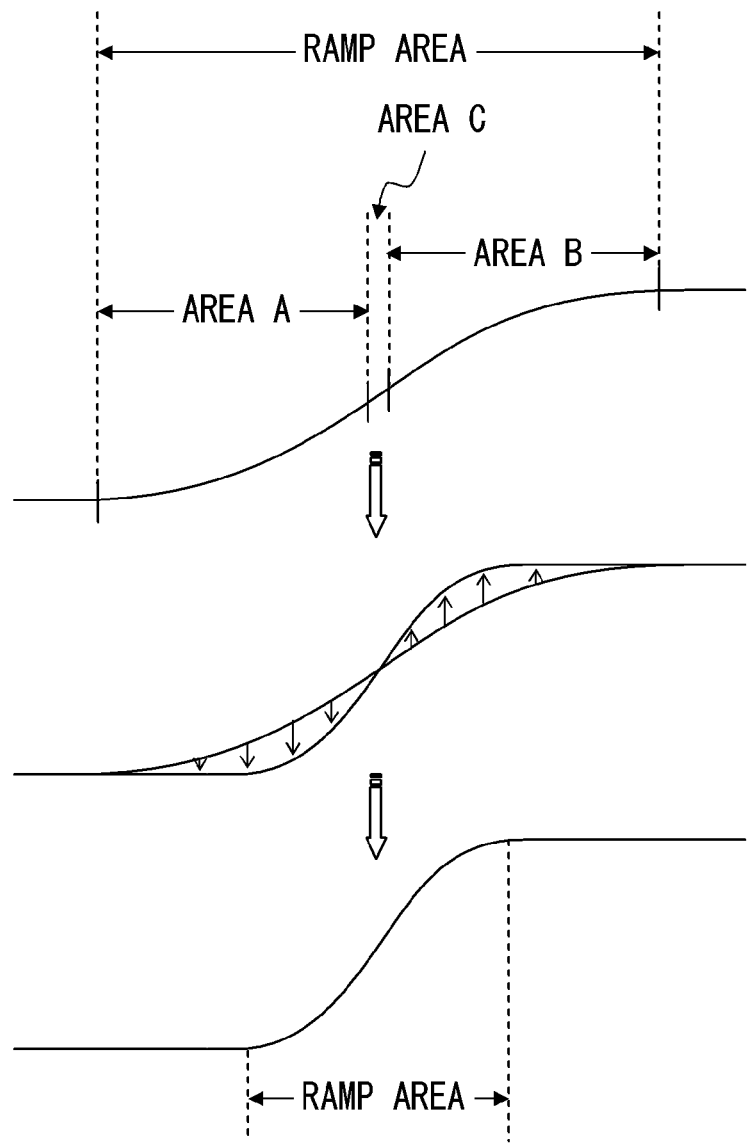
FIG. 1 is an explanatory view of a method for sharpening an edge.

A pixel having pixel intensity indexes that satisfy equation (4) is determined to belong to a blurred area (or to be arranged on an edge). Namely, the pixel that satisfies equation (4) is determined to be corrected. In contrast, a pixel having pixel intensity indexes that do not satisfy equation (4) is determined to not belong to the blurred area. Namely, the pixel that does not satisfy equation (4) is determined not to be corrected. Pixels within the ramp area illustrated in FIG. 1 are probably determined to belong to the blurred area according to equation (4).

Calculation of the Amount of a Correction (Steps S13 and S14)

Whether or not each of the pixels satisfies the following Cases (1) to (3) is checked.
Case1: $G_H > G_M > G_L$
Case2: $G_H < G_M < G_L$
Case3: $G_H < G_M$ and $G_L < G_M$ Case 1 represents a situation in which the gradient of brightness becomes steeper. Accordingly, a pixel belonging to Case 1 is considered to belong to the area (area A) where the brightness level is lower than the central level in the ramp area of the edge illustrated in FIG. 1. In the meantime, Case 2 represents a situation in which the gradient of brightness becomes more moderate. Accordingly, a pixel belonging to Case 2 is considered to belong to the area (area B) where the brightness level is higher than the central level. Case 3 represents a situation in which the gradient of the target pixel is higher than those of adjacent pixels. Namely, a pixel belonging to Case 3 is considered to belong to an area (area C) where the brightness level is the central level or about the central level. Then, the amount of a correction for the brightness level of each of the pixels extracted as a correction target is calculated.

If a pixel belongs to Case 1 (namely, if the pixel is positioned in the low brightness area within the ramp area), the amount of a correction Leveldown of the brightness of the pixel is represented with the following equation. "S" is a correction factor, and "θ" is obtained with equation (3) described above.

$$\text{If } \frac{G_H - G_M}{G_M - G_L} \geq 0.5 \; Leveludown(i,j) = (I_M - I_L) \times S$$

$$\text{else } Leveldown(i,j) = (I_M - I_L) \times \frac{2(G_H - G_M)}{G_M - G_L} S$$

$$S = 1 - (1 - \sqrt{2}) \frac{4\theta}{\pi}$$

If a pixel belongs to Case 2 (namely, if the pixel is positioned in the high brightness area within the ramp area), the amount of a correction Levelup of the brightness of the pixel is represented with the following equation.

$$\text{If } \frac{G_L - G_M}{G_M - G_H} \geq 0.5 \; Levelup(i,j) = (I_H - I_M) \times S$$

$$\text{else } Levelup(i,j) = (I_H - I_M) \times \frac{2(G_L - G_M)}{G_M - G_H} S$$

If a pixel belongs to Case 3 (namely, if the pixel is positioned in the central area within the ramp area), the amount of a correction is zero. The amount of a correction is zero also if a pixel belongs to none of Cases 1 to 3.

Correction (Step S15)

The pixel value (such as the brightness level) of each of the pixels of the original image is corrected. Here, pixel data "Image (i,j)" acquired with a correction performed for the pixel (i,j) is obtained with the following equation. "Original (i,j)" is pixel data of the pixel (i,j) of the original image.
Case 1: Image(i,j)=Original(i,j)−Leveldown(i,j)
Case 2: Image(i,j)=Original(i,j)+Levelup(i,j)
Other cases: Image(i,j)=Original(i,j)

The image correction apparatus 1 according to the embodiment may perform contour enhancement instead of or along with the above described blur correction. The contour enhancement, not particularly limited, is implemented, for example, with an unsharp mask. The unsharp mask calculates a difference iDiffValue(i,j) between an original image and a smoothed image of the original image. This difference represents also a direction of a change. This difference is adjusted by using a coefficient iStrength, and the adjusted difference is added to the original image. As a result, a contour is enhanced.

A calculation equation of the unsharp mask is as follows. iStrength is a constant that represents the strength of the contour enhancement.

corrected value NewValue(i,j)=Original(i,j)+ iDiffValue(i,j)×iStrength

As described above, in the image correction method according to the embodiment, the number of pixels that pixel value of which is corrected is reduced. Thus, according to the method of the embodiment, the amount of computation for a hand tremor correction is reduced.

Effects Produced by the Image Correction According to the Embodiment

Figure 15:
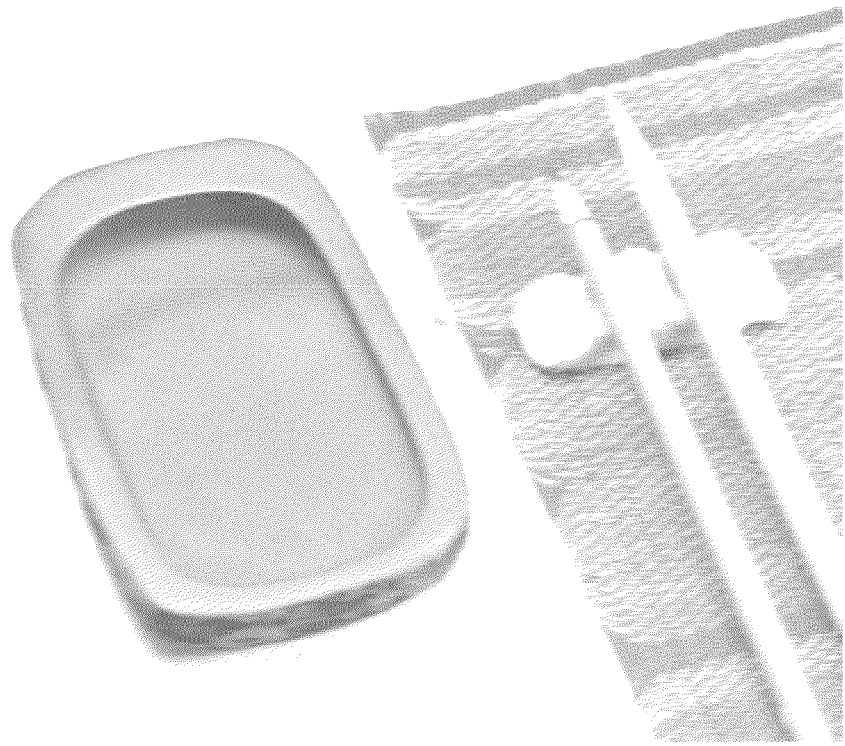
FIG. 15 illustrates an original image of a first example.
Figure 17:
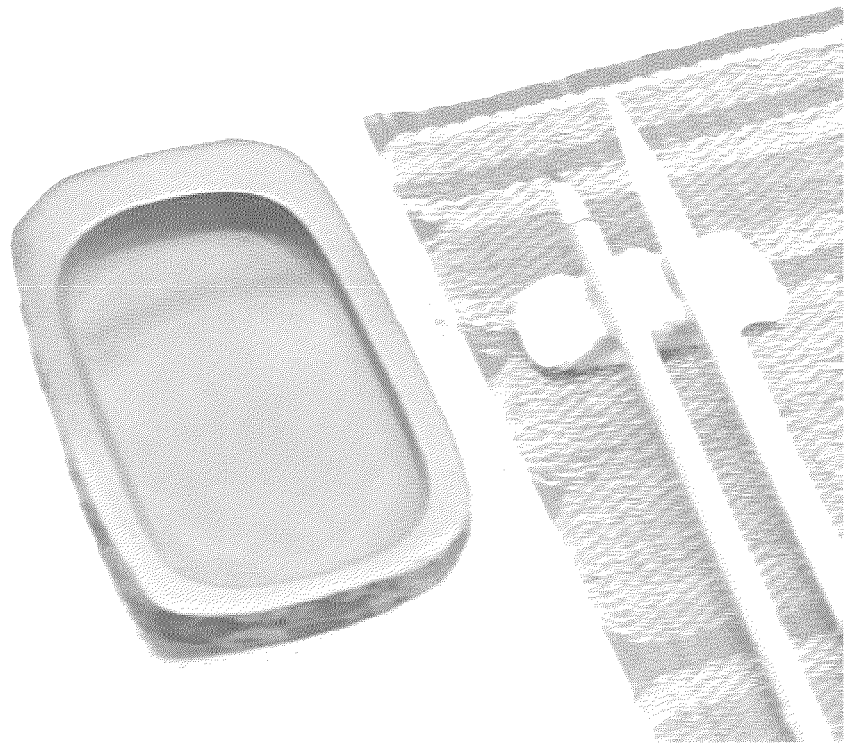
FIG. 17 illustrates an image corrected with another method.

FIGS. 15 to 19 are explanatory views of a first implementation example. FIG. 15 illustrates an original image. FIG. 16 illustrates an image corrected with the correction method according to the embodiment. FIG. 17 illustrates an image obtained by correcting pixels belonging to the area 1 illustrated in FIG. 5. As illustrated in FIG. 16, with the correction method according to the embodiment, a blur of a contour is corrected. In contrast, in the corrected image illustrated in FIG. 17, a shade of an ink stone is enhanced, which is unnatural.

Figure 18:
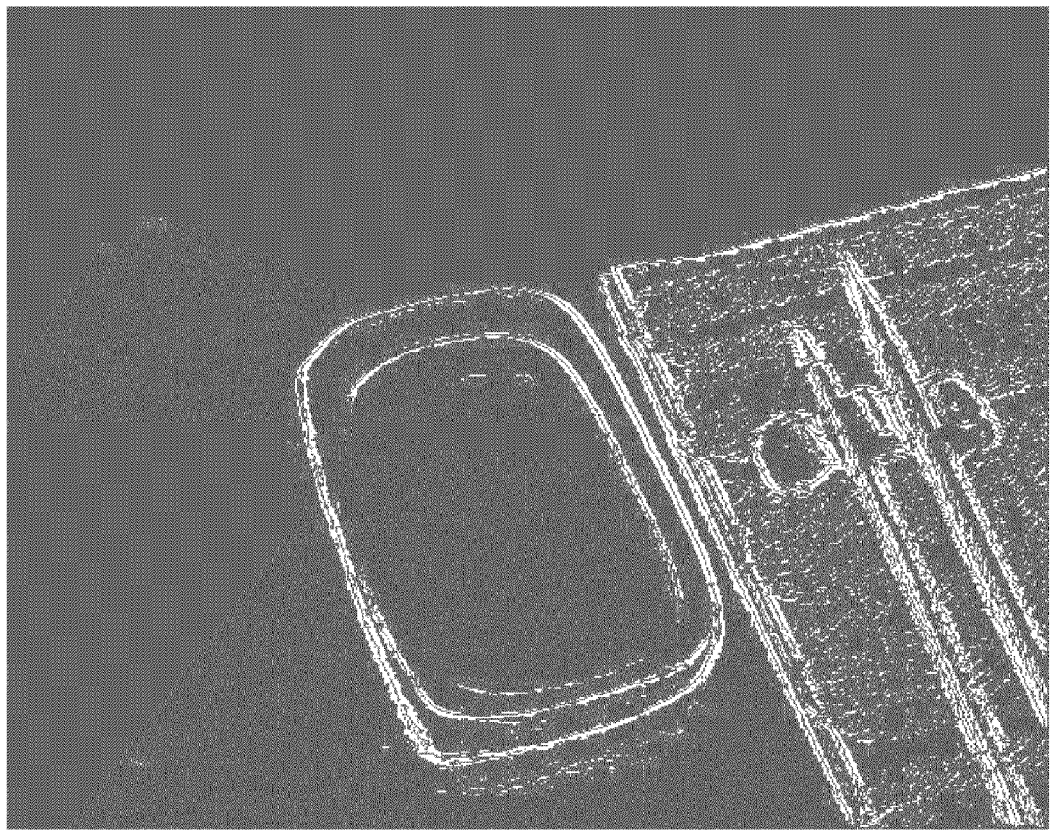
FIG. 18 illustrates pixels corrected in the corrected image of FIG. 16.
Figure 19:
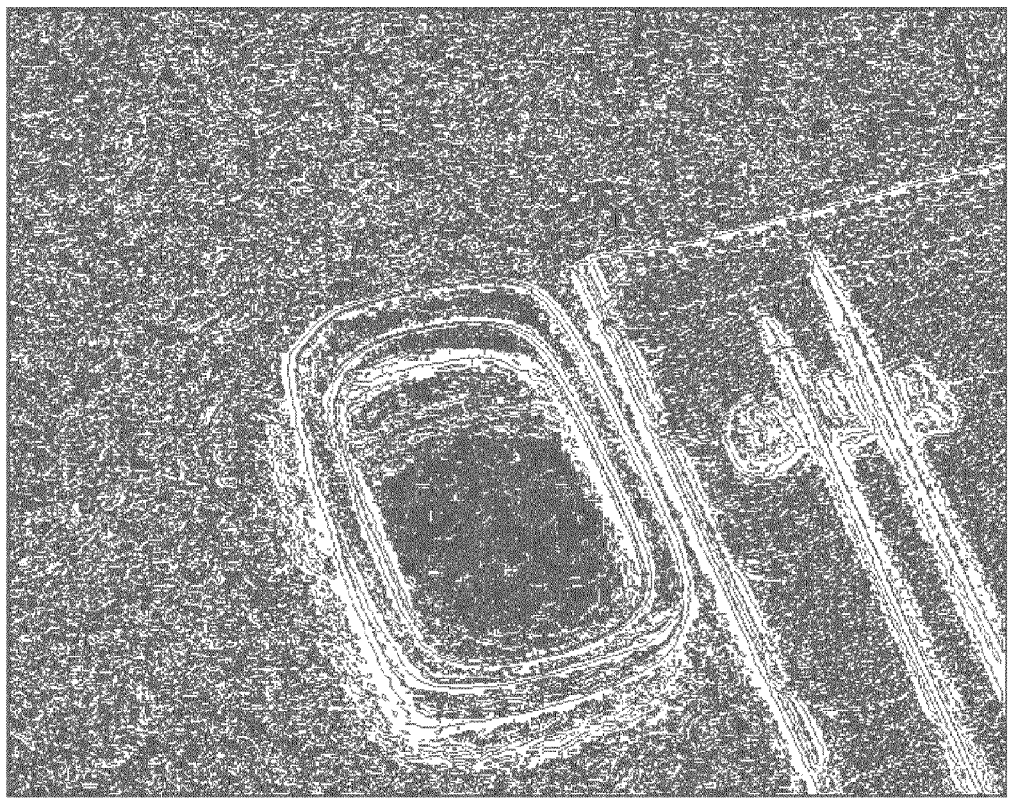
FIG. 19 illustrates pixels corrected in the corrected image of FIG. 17.

FIGS. 18 and 19 illustrate pixels the brightness level of which has been corrected. In FIGS. 18 and 19, the pixels the brightness level of which has been corrected are represented in white color. Here, FIGS. 18 and 19 correspond to FIGS. 16 and 17, respectively. Thus, with the correction method according to the embodiment, the number of pixels the brightness level of which is corrected is reduced.

Figure 20:
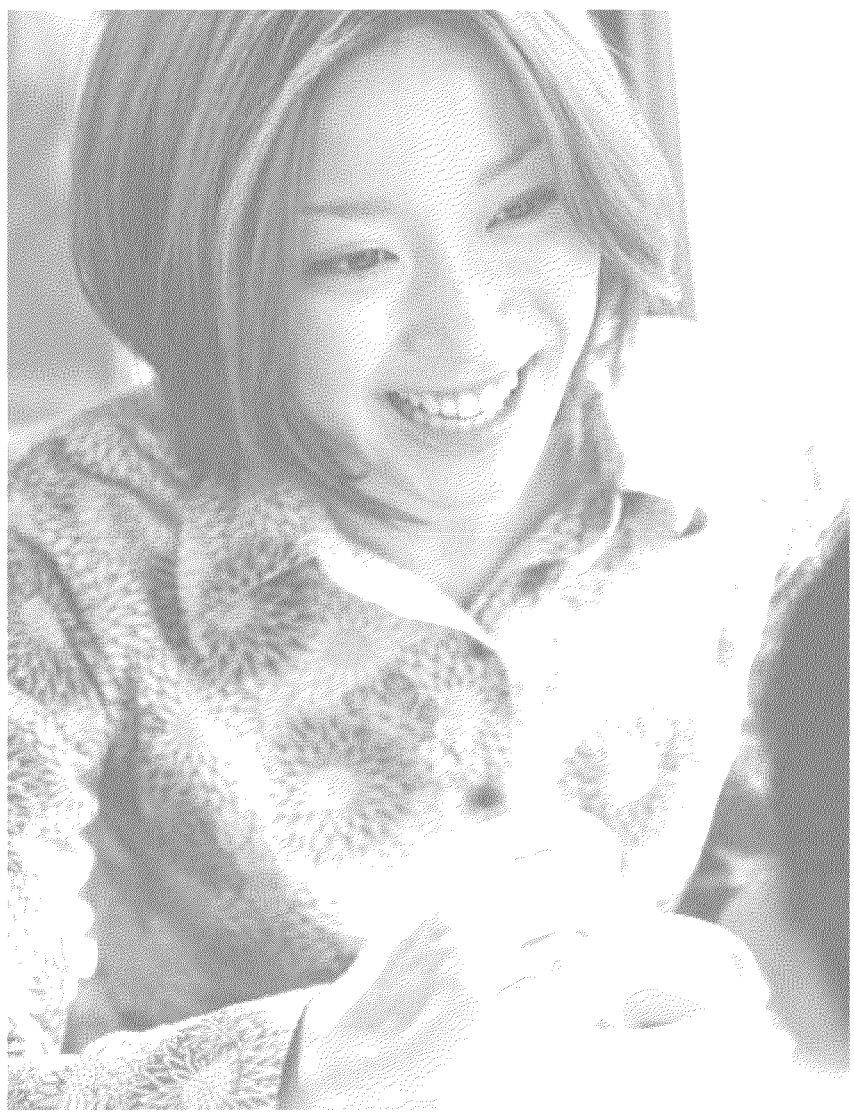
FIG. 20 illustrates an original image of a second example.
Figure 21:
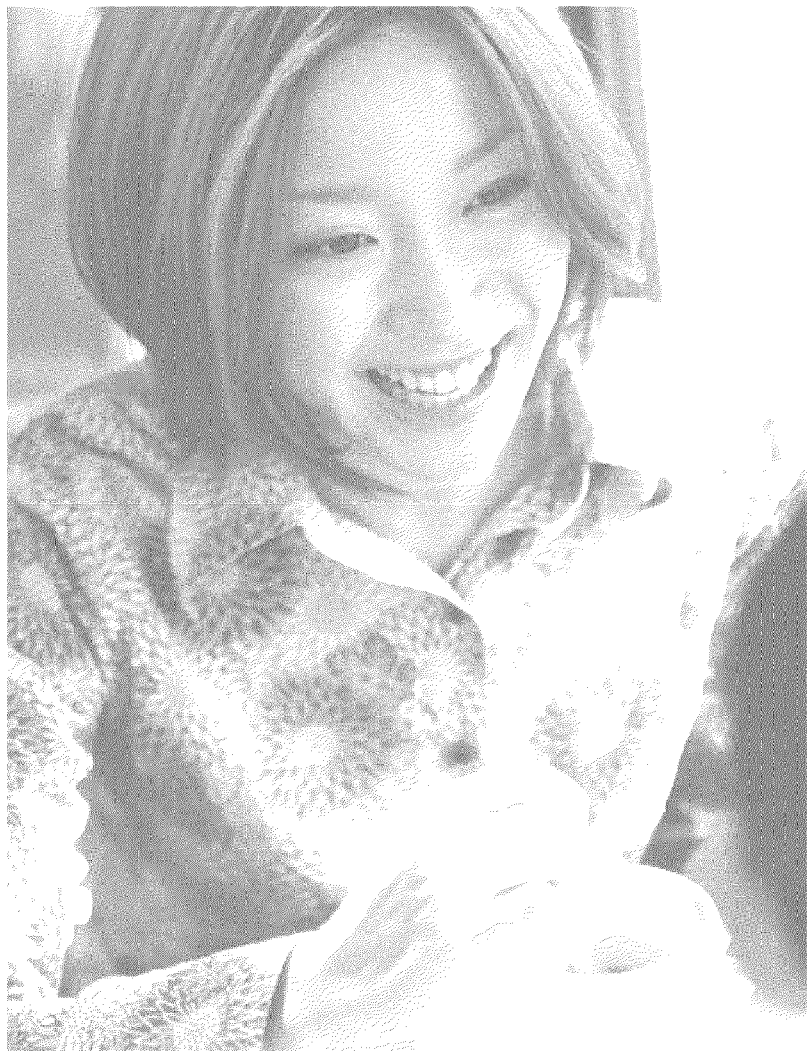
FIG. 21 illustrates an image corrected with the method according to the embodiment.
Figure 22:
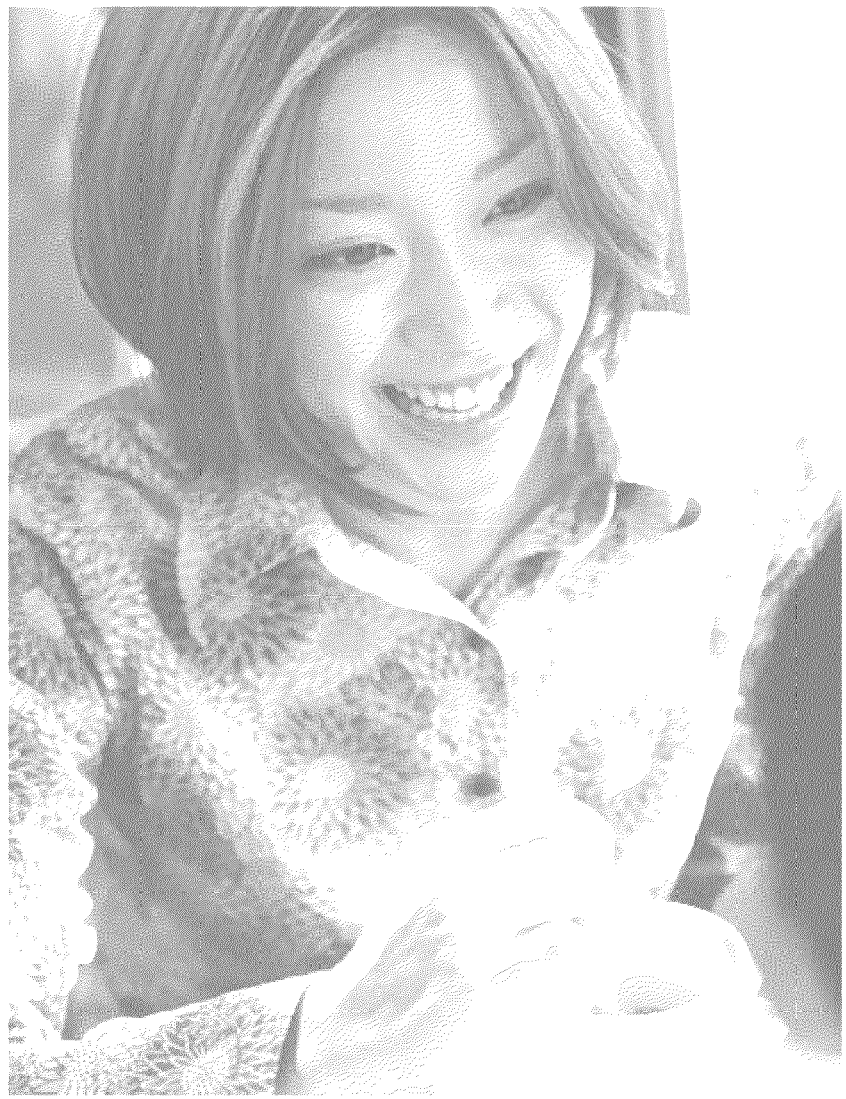
FIG. 22 illustrates an image corrected with another method.

FIGS. 20 to 22 are explanatory views of a second implementation example. FIG. 20 illustrates an original image. FIG. 21 illustrates an image corrected with the correction method according to the embodiment. FIG. 22 illustrates an image obtained by correcting pixels belonging to the area 3 illustrated in FIG. 5. As illustrated in FIG. 21, with the correction method according to the embodiment, a blur of a contour is corrected. In contrast, the concavity and the convexity of the surface of the face are enhanced in the corrected image illustrated in FIG. 22, making the corrected image unnatural. If the correction is performed for pixels belonging to the area 2 illustrated in FIG. 5, the shape of an edge sometimes becomes unnatural.

Hardware Configuration

Figure 23:
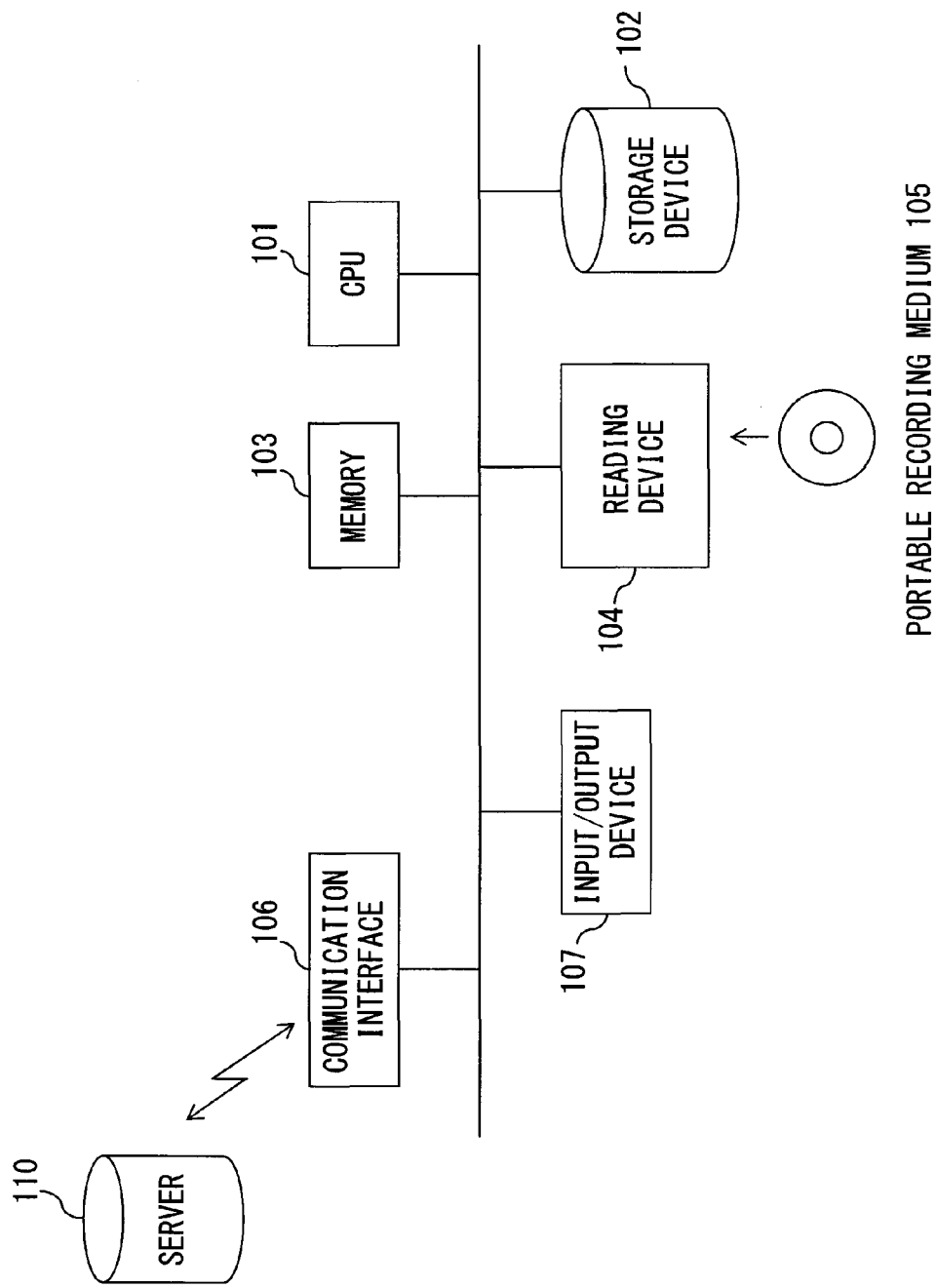
FIG. 23 illustrates a hardware configuration related to the image correction apparatus according to the embodiment.

FIG. 23 illustrates a hardware configuration related to the image correction apparatus 1 according to the embodiment. In FIG. 23, a CPU 101 executes an image correction program by using a memory 103. A storage device 102 is, for example, a hard disk, and stores the image correction program. The storage device 102 may be an external recording device. The memory 103 is, for example, a semiconductor memory. The memory 103 is configured to include RAM area and ROM area.

A reading device 104 accesses a portable recording medium 105 according to an instruction from the CPU 101. Examples of the portable recording medium 105 include a semiconductor device (PC card or the like), a medium to/from which information is input/output with a magnetic action, and a medium to/from which information is input/output with an optical action. A communication interface 106 transmits and receives data via a network according to an instruction from the CPU 101. An input/output device 107 corresponds to devices such as a camera, a display device, and a device that accepts an instruction from a user.

The image correction program according to this embodiment is provided, for example, in one or more of the following ways.
(1) Preinstalled in the storage device 102
(2) Provided by the portable recording medium 105
(3) Downloaded from a program server 110

The computer configured as described above executes the image correction program, whereby the image correction apparatus according to the embodiment is implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has(have) been described in detail, it should be understood that the various changes, substitutions, and alterations could be made hereto without departing from the spirit and scope of the invention.

What is claimed is:

1. An image correction apparatus, comprising:
a gradient detection unit configured to detect a gradient of a pixel value of each of pixels of an input image;
a blur width detection unit configured to detect a blur width at a position of each of the pixels of the input image;
a correction area identification unit configured to identify a correction area where the gradient detected by the gradient detection unit is larger than a gradient threshold and the blur width detected by the blur width detection unit is smaller than a blur width threshold; and
a correction unit configured to correct a pixel value of a pixel in the correction area identified by the correction area identification unit.

2. The image correction apparatus according to claim 1, further comprising
an edge detection filter configured to detect an edge within the input image, wherein
the gradient detection unit calculates a gradient of the pixel value of each of the pixels by using a detection result of the edge detection filter.

3. The image correction apparatus according to claim 1, further comprising
an edge detection filter configured to detect an edge within the input image, wherein
the blur width detection unit detects a blur width at the position of each of the pixels by using a detection result of the edge detection filter.

4. The image correction apparatus according to claim 3, wherein
the blur width detection unit specifies a direction of the gradient of the pixel value at the position of each of the pixels based on the detection result of the edge detection filter, and calculates a blur width based on a number of successive pixels having a same or nearly same direction of the gradient.

5. The image correction apparatus according to claim 2, wherein
a size of the edge detection filter is decided according to a size of the input image.

6. The image correction apparatus according to claim 2, wherein
the edge detection filter is a Sobel filter.

7. The image correction apparatus according to claim 1, wherein
the blur width threshold is decided according to a size of the input image.

8. The image correction apparatus according to claim 1, wherein
the correction unit performs a contour correction for sharpening an edge.

9. The image correction apparatus according to claim 1, wherein
the correction unit performs contour enhancement.

10. Image correction method, comprising:
detecting a gradient of a pixel value of each of pixels of an input image;
detecting a blur width at a position of each of the pixels of the input image;
identifying a correction area where the detected gradient detected is larger than a gradient threshold and the detected blur width is smaller than a blur width threshold; and
correcting a pixel value of a pixel in the identified correction area.

11. A non-transitory computer-readable medium on which is recorded an image correction program for causing a computer to execute an image correction method, the method comprising:
detecting a gradient of a pixel value of each of pixels of an input image;
detecting a blur width at a position of each of the pixels of the input image;
identifying a correction area where the detected gradient detected is larger than a gradient threshold and the detected blur width is smaller than a blur width threshold; and correcting
a pixel value of a pixel in the identified correction area.

* * * * *